Dec. 8, 1964    P. L. ENEGREN    3,160,422
IDLER ARM BEARING ASSEMBLY
Filed Aug. 20, 1962    2 Sheets-Sheet 1

INVENTOR.
PAUL L. ENEGREN
BY *Robert E. Breidenthal*
ATTORNEY

Dec. 8, 1964  P. L. ENEGREN  3,160,422
IDLER ARM BEARING ASSEMBLY
Filed Aug. 20, 1962  2 Sheets-Sheet 2
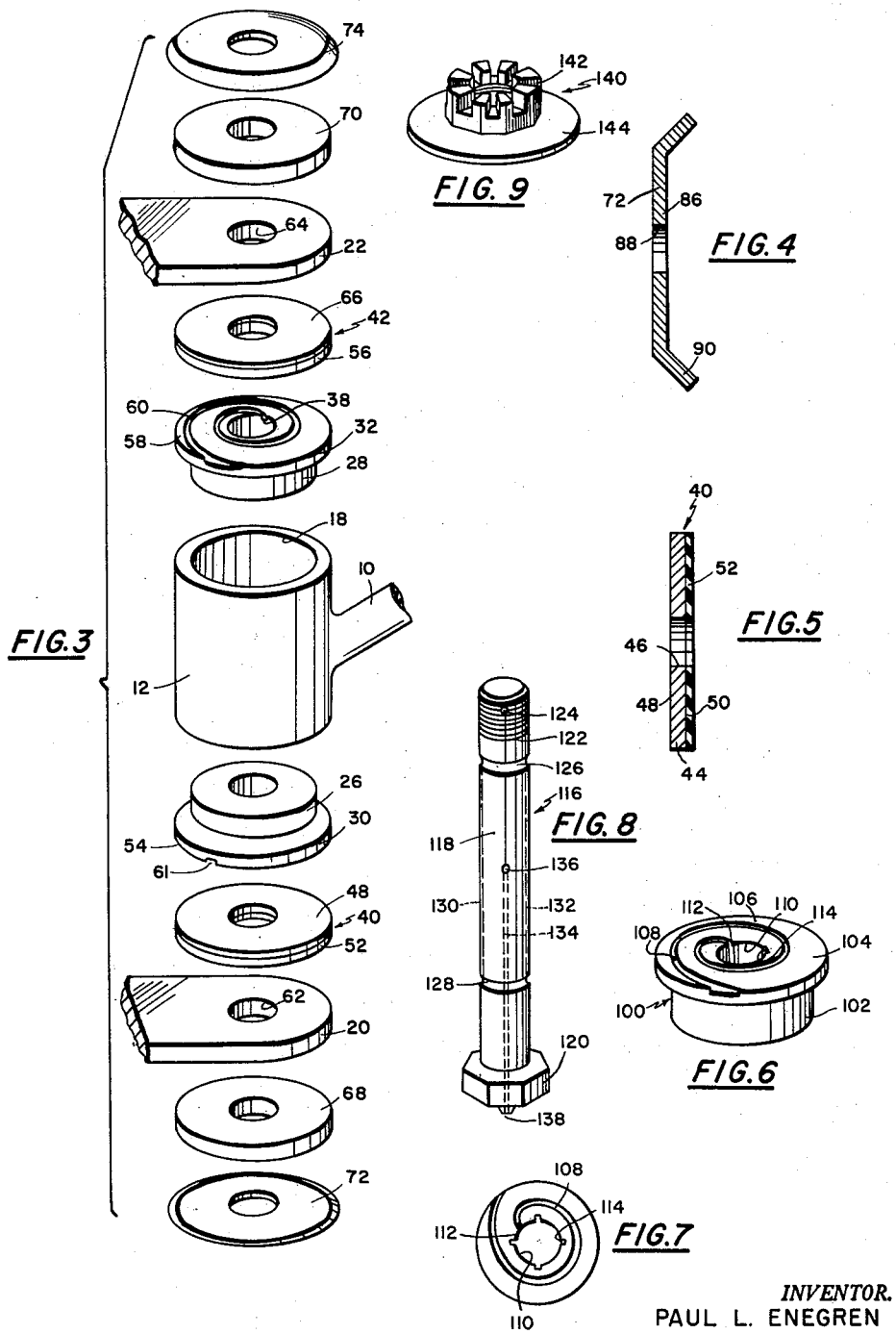
INVENTOR.
PAUL L. ENEGREN
BY
ATTORNEY United States Patent Office 3,160,422
Patented Dec. 8, 1964

3,160,422
IDLER ARM BEARING ASSEMBLY
Paul L. Enegren, 4201 Irving St., Wichita, Kans.
Filed Aug. 20, 1962, Ser. No. 218,079
17 Claims. (Cl. 280—95)

This invention relates to new and useful improvements in oscillatory mounting assemblies and components thereof, and more particularly pertains to a bearing assembly and components thereof for the idler arm of automotive steering apparatus.

In automotive steering systems, the idler arm is conventionally mounted to oscillate about the axis of a spindle that has one end rigidly secured to the frame of the automobile, or to oscillate (by means of a bearing or a resilient mounting) about the axis of a bolt extending between a pair of spaced ears that are fixed to the frame of the automobile.

Each of such arrangements as heretofore proposed is subject to one or more shortcomings. For example, it is generally preferred that the idler arm be mounted in such a manner as to either be yieldingly biased toward a neutral position or to offer some degree of drag or frictional resistance to oscillatory movement; however, the character of many proposed constructions either makes the initial thrust loading adjustment of the bearing to achieve the desired degree of drag critical so as to necessitate an initial adjustment by a relatively skilled mechanic and/or frequent readjustment is essential to maintain the frictional drag within acceptable limits.

The idler arm bearing assembly is conventionally disposed in a position where the same is exposed to road grit and water. Oscillatory mountings of the type employing bearings are difficult to seal against the ingress of such deleterious foreign matter, and when such foreign matter does gain ingress, such bearings are not ordinarily very effective as to any self-cleaning function, and consequently wear and develop looseness at an increasing rate. Additionally, the operation of the bearing as to offering a smooth frictional drag becomes erratic and rough so as to impose more severe operating conditions on other steering system components connected or linked to the idler arm. Insofar as is known, virtually all proposed idler arm oscillatory mounting systems employing bearings are subject in some degree to such criticisms, and especially those incorporating antifriction bearings of the ball or roller type.

With the present emphasis in the automotive industry on greatly increasing the length of the time and mileage intervals between lubrications of automotive steering and suspension components, the idler arm mounting assemblies of the type employing bearings heretofore proposed are objectionable in that they require relatively frequent lubrication if a reasonably satisfactory service life is to be realized, and are additionally subject to the criticism that the lubrication afforded all relatively movable parts is not uniform.

With respect to extant bearing assemblies wherein the idler arm is resiliently mounted to oscillate about a bolt extending between a pair of ears fixed on the automobile frame (such bolt extending through aligned openings in the ears), it has been found that it frequently occurs that undesired relative motion takes place between the ears and the means provided between the ears for resiliently mounting the idler arm about the bolt such as to result in enlargement of the openings in the ears through which the bolt passes with consequent severe loosening of the bolt and the resilient mounting of the idler arm.

It is an object of this invention to provide an oscillatory mounting assembly for an idler arm of the type including bearings such that the adjustment thereof to attain an acceptable drag is not critical and can be easily accomplished by a relatively unskilled mechanic.

It is another object of this invention to provide an oscillatory mounting assembly for an idler arm of the type including bearings such that the same is affected to a minimal extent by an environment of grit and water, and which bearings will tend to be self-cleaning.

A further object of this invention is to provide an oscillatory mounting assembly of the type employing bearings wherein at least one of all relatively movable contacting parts is a synthetic resin.

Yet another object of this invention is to provide an oscillatory mounting assembly of the type employing bearings such that lubrication is at most infrequently necessary, with such lubrication tending to be uniform to all relatively movable parts, and with such lubrication tending to clean the bearings of any accumulated foreign matter.

A very important object of this invention is to provide a modification kit to be used in combination with the bolt mounting ears and the idler arm of an extant oscillatory idler arm mounting assembly of the type wherein the idler arm is resiliently mounted on a bolt extending between ears fixed to the automobile frame to modify such extant system so as to realize the objects set forth below.

Another very important object of this invention is to provide a modification or repair kit to be utilized with conventional spindle-type idler arm assemblies (such spindle being rigidly connected to the automobile frame solely at one end), such that all sliding friction can be effectively limited to involve exclusively sliding engagement of synthetic resin bushings (nonrotatably secured to the idler arm) with other parts, whereby erratic frictional drag and excessive wear characteristics can be avoided that can be occasioned by relative sliding engagement of parts other than the synthetic resin bushings.

A further object of this invention is to provide a composite bearing component adapted to be interposed between a fixed abutment (such "fixed abutment" being either an integral flange on a spindle or an ear through which a bolt passes in stabilized relation thereto) and a rotating bearing such that the component will frictionally engage and remain stationary relative to the abutment while compensating for minor misalignment of the abutment and the rotating bearing.

A final object of this invention to be specifically enumerated herein is to provide a tubular bushing of synthetic resin having an end adapted for a rotary sliding thrust load such end being provided with a groove, preferably of spiral configuration, radially extending from the opening therethrough, whereby such end of the bushing can be easily lubricated and tends to be self-cleaning with respect to rotary thrust loads that may be imposed against such end of the bearing, and which bushing can optionally be additionally provided with one or more internal grooves (straight or of helical configuration) along its axial extent to facilitate supply of lubricant to the end groove and/or to facilitate self-cleaning of the bushing with respect to a shaft that may be journaled through the bushing.

One broad aspect of the invention involves an integral annular bearing which can be either synthetic resin or metal, but which is preferably bronze or brass with the latter being especially preferred, such bearing having faces at its opposite axial ends with one of such faces having bonded thereto a coating or layer of deformable friction material, such material preferably being an elastomer such as neoprene.

Another broad aspect of the invention involves the provision of an integral bushing of synthetic resin, preferably nylon, having a central opening therethrough, with one end of the bushing terminating in a surface symmetrical about the central axis, and such one end of the bushing being provided with a groove in said surface that spirals radially outward from the central opening. Such bushing can optionally be provided with one or more axially extending internal grooves.

An important aspect of the invention has to do with a repair or modification kit for conventional idler arm assemblies of the type wherein the tubular hub of an idler arm is disposed between a pair of spaced ears and is mounted to oscillate about an axis extending through the tubular hub and aligned openings through the ears, said kit comprising a pair of aligned bushings having their adjacent ends reduced and adapted to be non-rotatively received in opposed relation in the tubular hub, said bushings being of synthetic resin, a bolt journaled for rotation through the bushings, a pair of integral annular bearings on the bolt on opposite sides of the bushings and in sliding rotational contact with the latter, said annular bearings each having a side remote from the bushings provided with a layer of an elastomer bonded thereto, each of said coatings having an external surface having a coefficient of friction with metals higher than that which the synthetic resin has with the material of the annular bearings, said external surfaces of the coatings being adapted frictionally to engage adjacent surfaces of the ears, a pair of washers of an elastomer material on said bolt on the opposite sides of the washers being adapted to contact the remote sides of the ears, a pair of retainers on the bolt on opposite sides of the washers, said bolt having a head at one end thereof and a nut threaded on the other end thereof, and said bolt being adapted to extend through the tubular hub and the aligned openings through the ears. The remote axial ends of bushings are preferably provided with radial grooves from the bolt. Also, the bushings are preferably such as to be adapted to seal with the tubular hub of the idler arm and have their adjacent ends spaced with passageway means in the bolt communicating between one end of the bolt and space ambient to the bolt intermediate the bushings. The nut is provided with conventional means such as, for example, may include a cotter pin for securing the nut in an adjusted position on the bolt.

Other objects, aspects, features and advantages of the invention will become apparent in the light of the following description of preferred embodiments thereof, such preferred embodiments being illustrated in the accompanying drawings, wherein:

FIGURE 3 is an exploded isometric view of the assemblage of elements mounted on the bolt shown in FIGURES 1 and 2;

FIGURE 4 is an enlarged sectional view of a retainer used in the structures shown in FIGURES 1 through 3, inclusive, the view being taken upon the central axis of the retainer;

FIGURE 5 is an enlarged sectional detail view of one of the composite bearings employed in the structures shown in FIGURES 1 through 3, inclusive, this view being taken upon the central axis of the composite bearing;

FIGURE 6 is an isometric view of a modified synthetic resin bushing for use in lieu of the synthetic resin bushings shown in FIGURES 1 through 3, inclusive, this bushing being modified to the extent of including internal flutes or channels;

FIGURE 7 is an end view of the modified synthetic resin bushing shown in FIGURE 6;

FIGURE 8 is an isometric view of a modified bolt construction for use in lieu of the bolt shown in FIGURES 1 and 2; and, FIGURE 9 is an isometric view of a modified nut structure, such nut differing from that shown in FIGURE 2 to the extent of having an integral radially outward extending flange at one end thereof that can serve as a retainer or fixed abutment.

Figure 1:
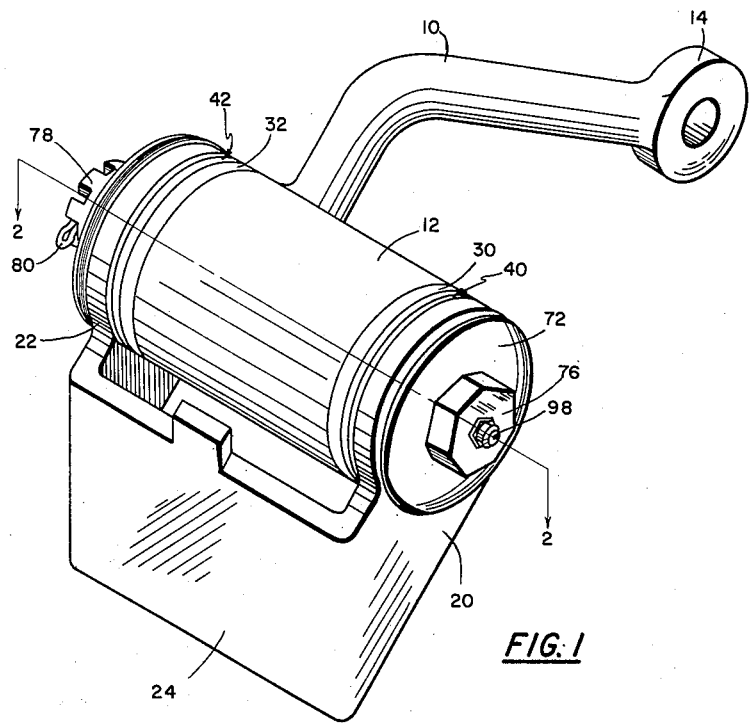
FIGURE 1 is an isometric view of an idler arm bearing assembly according to the invention, the same being shown as applied for oscillatory mounting of an idler arm about the axis of a bolt extending through the ears or flanges of a U-shaped mounting bracket normally rigidly attached to the frame of an automobile.

Referring now to the drawings, wherein like reference numerals designate like parts throughout the various views, attention is first directed to the form of the invention shown in FIGURES 1 through 5, inclusive.

The reference numeral 10 designates an idler arm that is provided at one end with an integral enlarged tubular hub 12 and which idler arm 10 is provided at its other end with means indicated at 14 for connection to a tie rod or drag link (not shown) in the conventional manner. The idler arm 10 is mounted for oscillation about the axis of a bolt 16, the tubular character of the hub 12 being defined by an opening 18 through the hub having a central axis substantially coincident with the axis of the bolt 16.

As will be described in greater detail hereinafter, the bolt 16 is carried by and extends through and between a pair of ears or flanges 20 and 22 of a U-shaped mounting bracket that includes a web portion 24. The U-shaped idler arm mounting bracket comprised of the ears 20 and 22 and the connecting web portion 24 is of substantially conventional character, and is preferably formed of steel, and as will be readily understood by those skilled in the art, the same is customarily rigidly attached as by welding or the like along the lower edges of the ears 20 and 22 and the web portion 24 as viewed in FIGURE 1 to the frame (not shown) of an automobile.

A pair of bushings 26 and 28 are nonrotatably received in opposed relation in the opposite ends of the opening 18 of the tubular hub 12. The adjacent ends of the bushings 26 and 28 are of such diameter as to be snugly received in the opening 18, and preferably require being pressed or driven into the opening 18 so as to assure their being nonrotatable with respect to the tubular hub 12. The adjacent ends of the bushings 26 and 28 can be and preferably are slightly tapered toward each other so as to facilitate their insertion in the tubular hub 12 and to enhance the snugness of the fit of the bushings 26 and 28 in the tubular hub 12.

A number of synthetic resins are known to be suitable for bearing use involving sliding contact with either metals or the same or other synthetic resins of such general category. The bushings 26 and 28 are made of a synthetic resin or mixture of synthetic resins of such general bearing material category, and as is known in the art of the use of such synthetic resin materials for bearings, the synthetic resin of the bushings 26 and 28 can, if deemed necessary or expedient, include one or more lubricating agents. Examples of synthetic resins of the class generally suitable for bearing use are given in three United States patents issued to Melton and Wilkinson, wherein such synthetic resins are also shown as applied to bearing use as bushings and washers in idler arm assemblies. Such patents are U.S. Patent No. 2,995,381 entitled Idler Arm Assembly issued August 8, 1961; U.S. Patent No. 3,010,733 entitled Idler Arm Bearing and Assembly issued November 28, 1961; and U.S. Patent No. 3,031,202 entitled Steering Mechanism Idler Arm Assembly issued April 24, 1962.

The synthetic resin bushings 26 and 28 include integral heads in that their remote end portions are relatively enlarged as indicated at 30 and 32, with such enlarged portions 30 and 32 engaging the opposite extremities of the tubular hub 12 to limit the extent that the bushings 26 and 28 extend into the opening 18, it being noted that the adjacent ends of the bushings 26 and 28 are spaced so as to define a chamber 34 within the tubular hub 12. The engagement of the bushings 26 and 28 with the tubular hub 12 is not only such as to prevent rotation of the bushings 26 and 28 in the tubular hub 12, but the engagement of the bushings 26 and 28 with the tubular hub 12 is also such as to seal the chamber 34.

The bushings 26 and 28 are provided with central aligned openings 36 and 38 through which the steel bolt 16 is rotatably journaled, whereby the sliding engagement of the bolt 16 with the bushings 26 and 28 enjoys the well known advantage of the low coefficient of sliding friction of synthetic resins of the bearing class previously defined with metals.

A pair of composite annular bearing members 40 and 42 are provided, which are disposed about the bolt 16 on the opposite ends of the bushings 26 and 28. Inasmuch as the composite bearing members 40 and 42 are identical in construction, a detailed description of the composite bearing 40 shown in FIGURE 5 will suffice for both. The composite bearing member 40 is comprised of an annular bearing 44 having a central axial opening 46 suitable for slidably receiving the bolt 16 therethrough. The annular bearing 44 has first and second opposite end surfaces designated by the reference numerals 48 and 50. Said composite bearing member 40 includes means for inhibiting rotation of the annular bearing 44 relative to the bolt 16 and also for accommodating axial alignment of the annular bearing 44 and the bolt 16 to any minor irregularity of the ear or abutment 20 with such means comprising layer or coating 52 of friction material, preferably deformable, having a flat washer-like configuration bonded or in any suitable manner, such as by cementing or the use of adhesives, fixedly secured to the surface 50 of the annular bearing 44. While the annular bearing 44 can be a synthetic resin of the class previously defined, either the same as or specifically different from the synthetic resin selected for the bushings 26 and 28, the annular bearing 44 is preferably made of metal, and it is especially preferred that the annular bearing 44 be made of an alloy of copper, such as bronze or brass. Inasmuch as the synthetic resin known as nylon is the especially preferred material for the bushings 26 and 28 for a plurality of reasons among which may be mentioned the relatively low cost of nylon, its toughness, the ease of fabrication of shaped articles of nylon by conventional injection molding techniques, and the durability and excellent friction characteristics of nylon in sliding contact with metals; the use of brass as the material of the annular bear 44 is especially indicated because of the superior wear and friction characteristics realized on sliding engagement of nylon on brass.

The material of the layer 52 is selected so as to have a coefficient of sliding friction with steel greater than that which the surface 48 of the material selected for the bearing 44 has with the synthetic resin selected for the bushings 26 and 28. Also, the material selected for the layer or coating 52 is preferably such as to be deformable for a purpose to be presently explained. The material of the layer 52 is preferably deformable in the sense of being resilient and rubber-like and the same should also be durable in the environment of idler arm use such as to being in the presence of lubricants incorporating hydrocarbons, etc. In view of the foregoing considerations, the material selected for the layer or coating 52 is preferably an elastomer such as neoprene.

In the event that the material of the annular bearing 44 constituting the surface 48 is to be a syntheic resin, the elastomer (preferably neoprene) constituting the layer or coating 52 can be securely bonded thereto in any suitable manner, such as for example, by procedures analogous to the processes disclosed in U.S. Patent No. 2,777,-783 entitled Method of Coating a Surface With Polyhalocarbon Resin and Article Formed Thereby issued January 15, 1957 to Welch, and U.S. Patent No. 3,011,219 entitled Method of Forming a Ball Joint Utilizing a Fluorocarbon Layer issued December 5, 1961 to Williams. When the material for the annular bearing 44 is a metal, preferably brass, the composite bearing 40 can be conveniently made by bonding the material of the layer 52 to one side of a metallic sheet, after which the specific transverse configuration of the composite bearing 40 is punched from the coated sheet of metal. Known to those skilled in the coating art are a number of processes whereby a layer of neoprene can be bonded or cemented to a metallic surface. A particularly convenient and preferred process for adhering a layer of neoprene to brass presently being commercialized by the B. F. Goodrich Company is one which involves initially spraying a thin liquid primer coat on the metallic surface, after which an unpolymerized or uncured fluid form of neoprene is sprayed over the primer coat that will thereafter polymerize of air cure at room temperature. Alternatively, the layer 52 can be fabricated separately from the annular bearing 44 as a washer of neoprene, and thereafter suitably bonded, cemented or vulcanized to the surface 50 of the annular bearing 44.

As an alternative means of bonding the layer of neoprene 52 to the brass annular bearing 44, a technique similar or analogous to that described in U.S. Patent No. 2,934,366 entitled Pre-Assembled Ball and Socket Joint issued April 26, 1960 to Moskovitz can be employed in that powdered brass or bronze can be sintered in a reducing atmosphere to the surface 50 of the brass bearing 44 to provide an integral porous continuation of the bearing 44, and thereafter an unpolymerized or uncured fluid form of neoprene can be coated upon the porous side of the bearing 44 so as to cover and penetrate into the integral porous continuation of the bearing 44, after which the neoprene is polymerized to constitute the layer 52. It is also contemplated that the bearing 44 can be sintered metal such as brass or bronze so as to be porous throughout its axial extent, with a fluid unpolymerized or uncured form of neoprene being coated on the surface 50 so as to partially penetrate the axial extent of the bearing 44. The neoprene is then cured and the surface 48 of the bearing 44 is then treated with a lubricant so as to penetrate the bearing and saturate at least some of the porosity of the bearing 44 adjacent the surface 48.

The axial extent of the layer 52 is not particularly critical, and a suitable range of dimensions will become apparent to those familiar with the art as the purpose of the layer 52 is described hereinafter in greater detail. Inasmuch as an axial extent of about four one-thousandths of an inch has been found suitable for the layer 52 in an actual working embodiment of the form of the invention shown in FIGURES 1 and 2, the relative axial extent of the layer 52 and respect to that of the annular bearing 44 is exaggerated in the drawings, though of course the layer 52 can be of as great an axial extent as may be deemed necessary or desirable in particular applications.

The composite bearing 40 is disposed on the bolt 16 so that the surface 48 is in sliding engagement with the axially extreme surface 54 of the bushing 26. The composite bearing 42 is disposed on the bolt 16 in opposed relation to the composite bearing 40 so that the annular bearing component 56 thereof is in sliding engagement with the axially extreme surface 58 of the bushing 28. The axially extreme surfaces 54 and 58 of the bushings 26 and 28 are symmetrical about the axis of the bolt 16, and are preferably planar surfaces, though they can be frusto-conical for example. The surfaces of the composite bearings 40 and 42 in sliding engagement with the surfaces 54 and 58 are in any event complementary thereto, so that surfaces of sliding contact are established that are symmetrical about the axis of the bolt 16. In the preferred construction of the bushings 26 and 28, the axially extreme surfaces 54 and 58 are provided with one or more radially extending grooves, with the illustrated embodiment of the invention employing a single radially extending groove of spiral configuration. Attention is directed to FIGURE 3 where one of such spiral grooves, designated at 60, is shown in connection with the surface 58 of the bushing 28. A similar spiral groove 61 in the bushing 26 can be seen in FIGURE 2. It will be noted that the spiral grooves 60 and 61 are of more than 360° extent about the axis of the bushings 28 and 26 and extend from the openings 38 and 36 or bolt 16 to the radial peripheries of the surfaces 58 and 54. The purpose and function of the spiral grooves 60 and 61 in the bushings 28 and 26 will be described presently.

The ears 20 and 22 are provided with aligned openings 62 and 64, respectively, through which the bolt 16 extends, it being noted that the ears 20 and 22 are disposed on opposite sides of the composite bearings 40 and 42, and respectively engage the elastomer layers 52 and 66 of such composite bearings, respectively. Resilient annular washers 68 and 70, preferably of neoprene, are disposed about the bolt 16 on opposite sides of the ears 20 and 22, with annular retainers 72 and 74 being disposed about the bolt 16 on opposite sides of the resilient washers 68 and 70 as shown.

One end of the bolt 16 includes an integral polygonal head 76 that engages the retainer 72, and the opposite extremity of the bolt 16 is threaded and provided with a steel slotted nut 78 threaded thereon in engagement with the retainer 74. The slotted nut 78 is secured in adjusted position on the bolt 16 by means of a conventional cotter pin 80.

The resilient washers 68 and 70 in their relaxed dimensions have internal openings 82 and 84 that snugly fit upon the bolt 16, preferably with just sufficient clearance so that they can be positioned along the length of the bolt 16 without difficulty. The axial extent of the washers 68 and 70 in their relaxed condition should be substantial, but is not critical. An axial extent of about ¼ inch was found to be quite satisfactory in an actual working embodiment of the structure shown in FIGURES 1 and 2. The external diameters of the washers 68 and 70 in their relaxed condition are considerably smaller than the radial extents of the ears 20 and 22 about the bolt 16, so that the radial expansion of such washers when they are placed under axial compression will not cause the washers 68 and 70 to extend beyond the peripheral extents of the ears 20 and 22.

The annular retainers 72 and 74 are preferably steel, and inasmuch as they are identical a detailed description of the annular retainer 72 shown in FIGURE 4 will suffice for both. The annular retainer 72, as shown in FIGURE 4 comprises a flat central portion 86 provided with a central opening 88 for receiving the bolt 16 therethrough. The peripheral margin of the flat portion 86 of the annular retainer 72 is provided with an angularly inclined integral flange, whereby the retainer 72 has an over-all cup-shaped configuration. The peripheral flange 90 is preferably inclined to the central flat portion 86, at an angle of approximately 45° as it has been found that such a configuration will cooperate better with the resilient washer 68 engaged thereby in order to fix or immobilize the bolt 16 with respect to the ear 20. While the provision of a peripheral flange 90 inclined as illustrated and described is preferred, the inclination of the flange 90 can be substantially greater or less than 45° as may be desired.

Figure 2:
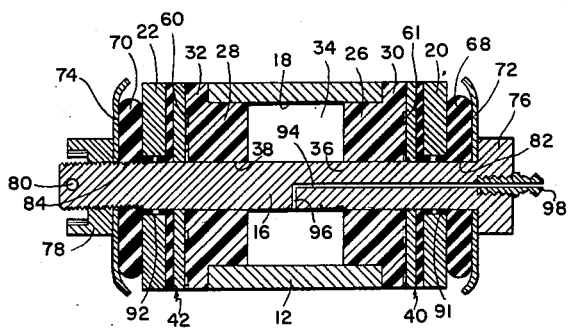
FIGURE 2 is a central longitudinal sectional view of the bearing structure shown in FIGURE 1, the view being taken upon the plane of the section line 2—2 in FIGURE 1, with only the tubular hub portion of the idler arm being shown.

The tubular hub 12, the synthetic resin bushings 26 and 28, the composite bearings 40 and 42, the resilient washers 68 and 70, and the annular retainers 72 and 74 are assembled on the bolt 16 and the ears 20 and 22 and secured by the nut 78 and the cotter pin 80 as shown in FIGURES 1 and 2. The nut 78 is tightened on the bolt 16 to such an extent that the resilient washers 68 and 70 are compressed and frictionally engage both the ears 20 and 22 and the bolt 16 with sufficient frictional force so as to prevent relative rotation of the bolt 16 with respect to the ears 20 and 22. The adjacent faces of the ears can then be considered the equivalent of abutments fixed in position on the bolt 16, in which case the ear 20 and the bolt 16 can be considered equivalent to an integrally flanged spindle.

In the event that the openings 62 and 64 in the ears 20 and 22 are oversize with respect to the diameter of the bolt 16, such as can be occasioned by previous use of the ears 20 and 22 in connection with a loose bolt, the central portions of the resilient washers 68 and 70 are compressed to project into the openings 62 and 64 about the bolt 16 as indicated at 91 and 92 to fixedly secure the bolt 16 against transverse or lateral movement within the openings 62 and 64. A study of an actual working model of the structure shown in FIGURES 1 and 2 has indicated that the projections 91 and 92 can extend virtually entirely through the openings 62 and 64. In view of the resilient character of the layers 52 and 66, they too can (if of sufficient axial extent) project into openings 62 and 64 as shown in FIGURE 2 on an exaggerated scale.

While it is of course preferred that the openings 62 and 64 make a close fit about the bolt 16, the openings 62 and 64 can be deliberately made oversize, if deemed necessary or expedient, so as to enjoy the stabilizing influence of the washers 68 and 70 projecting into the openings 62 and 64. The primary advantage of the resilient washers 68 and 70 projecting as indicated at 91 and 92 is in the use of the other components of the illustrated construction as a repair or modification kit with an old idler arm 10 and old ears 20 and 22 in which the openings in the latter have become enlarged through wear.

Axial compression of the resilient washers 68 and 70 against the remote sides of the ears 20 and 22 is accompanied by a minor degree of flexure of the ears 20 and 22 towards each other, such minor degree of flexure of the ears 20 and 22 being sufficient to forcibly engage the ears 20 and 22 with the friction layers 52 and 66 of the composite bearings 40 and 42, such engagement being sufficient to prevent positively or at least very strongly inhibit any relative rotation of the composite bearings 40 and 42 with respect to the ears 20 and 22 during oscillation of the idler arm 10. Also, such forcible engagement of the ears 20 and 22 with the composite bearings 40 and 42 axially loads the frictional engagement of the annular bearings 44 and 56 against the bushings 26 and 28, whereby the extent to which the nut 78 is tightened upon the bolt 16 governs the smooth frictional drag of the idler arm 10 in its oscillatory motion with respect to the ears 20 and 22. Because of the axial compressibility of the resilient washers 68 and 70, the frictional drag of the idler arm 10 varies gradually with adjustment of the nut 78 on the bolt 16, whereby the adjustment of such frictional drag is not critical with the axial position of the nut 78 and the drag can change after initial adjustment only slowly if at all with respect to time and usage with the nut 78 secured by the cotter pin 80.

Means is provided for lubricating the bearing construction shown in FIGURES 1 and 2, such means comprising an L-shaped passageway in the bolt 16 that includes a central portion 94 extending from the headed end of the bolt 16 to a position intermediate the adjacent extremities of the bushings 26 and 28, and a lateral portion 96 communicating between the passageway portion 94 and the chamber 34. The passageway portion 94 is provided with a conventional grease fitting 98 at the headed end portion 76 of the bolt 16, whereby a grease or lubricant can be introduced into the chamber 34 under pressure. The chamber 34 constitutes a reservoir for grease or lubricant, with lubricant or grease proceeding therefrom through the openings 36 and 38 to the radially inwardly ends of the spiral grooves 60 and 61, whence the grease or lubricant proceeds to the radially outward extremity of such grooves 60 and 61. Despite the fact that the openings 36 and 38 only afford sufficient rotary running clearance for the bolt 16, it is found that such clearance will ordinarily afford adequate space for the described movement of grease or lubricant, especially when the latter is under pressure. Oscillation of the idler arm 10 will tend to cause flow of grease or lubricant from the chamber 34 to the grooves 60 and 61.

Not only do the grooves 60 and 61 afford paths for the flow of grease or lubricant, it will also be noted that during oscillation of the idler arm 10 that such grooves 60 and 61 filled with grease or lubricant will sweep all or nearly all of the contacting areas of the adjacent composite bearings 40 and 42. The grooves 60 and 61 also serve as spaces in which grit, foreign matter and wear particles can migrate so as to not be disposed directly between contacting sliding surfaces. Such foreign matter migrating into the grooves 60 and 61 tend to work radially outward in the grooves 60 and 61 along with grease and lubricant to be effectively discharged from the bearing structure. It will also be noted that during pressure lubrication of the bearing assembly that grease or lubricant is forced radially outward through the grooves 60 and 61 so as to effectively clean the bearing structure of foreign matter.

An advantage of the illustrated and described means for lubrication resides in the fact that the same is symmetrical with respect to the bushings 26 and 28 from the chamber 34, so that both bushings tend to be lubricated uniformly.

Not only do the deformable friction layers 52 and 66 of the composite bearings 40 and 42 frictionally lock against the ears 20 and 22, but additionally the deformable and preferably resilient characteristics of such layers allows the composite bearing members 40 and 42 to be self-aligning relative to the bushings 26 and 28, it being noted that some misalignment will ordinarily tend to occur during flexure of the ears 20 and 22 towards and away from each other. Also, the deformable characteristics of the layers 52 and 66 compensates for any surface irregularities of minor magnitude on opposing faces of the ears 20 and 22 insofar as such irregularities might tend to warp the annular bearings 44 and 56.

Attention is now directed to FIGURE 6 wherein a modified form of bushing designated generally at 100 is illustrated that can be used in lieu of either one or both the bushings 26 and 28. The bushing 100 is generally similar to the previously described bushings 26 and 28 and is made of a synthetic resin such as previously specified. The bushing 100 includes a portion 102 of a size suitable to be press fitted into the tubular hub 12 and a radially enlarged end portion 104 for limiting the extent to which the bushing 100 is inserted in the tubular hub 12. The axial extremity of the enlarged portion 104 terminates in a surface 106 that is symmetrical about the longitudinal axis of the bushing 100, such surface 106 being preferably planar as shown. The surface 106 is provided with a spiraled groove 108 that extends from a central opening 110 through the bushing 100 to the radial periphery of the enlarged portion 104. As thus far described, the bushing 100 is identical to the previously described bushings 26 and 28. The bushing 100 differs from the bushings 26 and 28 solely to the extent of being provided with one or more axially extending internal channels or flutes such as those shown at 112 and 114, such flutes or channels 112 and 114 being for the purpose of defining jointly with the bolt 16 one or more circumferentially spaced passageways for the passage of grease or lubricant from the chamber 34. To facilitate the achievement of such function, it will be noted that the flute or channel 112 communicates with the inner end of the spiral groove 108 thereby affording a continuous passageway for lubricant or grease from the chamber 34 to the outside of the bearing assembly. In addition to serving the function of constituting passageways for grease or lubricant, the channels or flutes 112 and 114 constitute spaces for receiving grit or foreign matter that may work into the bearing assembly. In this latter regard, the flutes or channels 112 and 114 serve the same functions and can be given the longitudinal configurations and transverse contours such as shown and described in connection with channels and slots shown in the bushing construction of U.S. Patent No. 2,831,737 entitled Bearing Construction issued April 22, 1958, to Jacoby. It will be observed that the previously described grooves 60, 61 and 108 perform the last-mentioned function in much the same manner as the flutes or channels 112 and 114.

Attention is now directed to FIGURE 8 wherein a modified bolt construction is shown that can be used in lieu of the previously described bolt 16. The modified bolt construction shown in FIGURE 8 is designated generally at 116, the same comprising a cylindrical shank 118 provided with a polygonal head 120 at one end and external threads 122 at the other end, such threaded portion 122 of the bolt being provided with an opening 124 suitable for the reception of a cotter pin. Intermediate its ends, the bolt 116 is provided with a pair of annular grooves 126 and 128 that are so spaced as to coincide with the inner ends of the grooves 61 and 60 of the bushings 26 and 28. The annular grooves 126 and 128 are connected by one or more longitudinally extending grooves such as those indicated at 130 and 132. The bolt 116 is also provided with L-shaped passageway means including portions 134 and 136 that correspond in position and function to the previously described passageway portions 94 and 96 in the bolt 16. The passageway portion 134 is provided with a conventional grease fitting 138 that corresponds to the previously described grease fitting 98. The grooves 126, 128, 130 and 132 constitute passageway means in conjunction with the bushings 26 and 28 for the passage of grease or lubricant from the chamber 34 to the inner ends of the spiraled grooves 61 and 60, as will be readily appreciated. The bolt construction 116 can be used with the bushings 26 and 28, or the previously described bushing 100 can be used in lieu of the bushings 26 and 28.

Attention is now directed to FIGURE 9 wherein a modified nut construction is shown which can be used in lieu of the previously described nut 78 or in lieu of the combination of the previously described nut 78 and retainer 74. The modified nut construction shown in FIGURE 9 is designated generally at 140, the same comprising a conventional slotted and internally threaded nut structure 142 having a polygonal external configuration, modified by having an integral radially outwardly extending metal flange 144 at the end of the nut 142 opposite the slotted end of the conventional nut structure 142.

It will be observed from the foregoing description of preferred embodiments of the invention that the resilient washer 68 and the retainer 72 can be considered as means for fixing the position of the ear 20 with respect to the bolt 16 so that the ear 20 defines an abutment fixed with respect to the bolt 20 for engaging the composite washer 40. Accordingly, from a practical viewpoint the ear 20 can be considered fixed on the bolt 16 and essentially integral therewith. With this viewpoint in mind, the employment of certain components of the structure shown in FIGURE 2 in conjunction with the modified nut construction 140 shown in FIGURE 9 for the purpose of modifying idler arm assemblies of the type using a flanged spindle instead of a bolt extending through ears will be readily understood. Referring to FIGURE 2 of the previously mentioned U.S. Patent No. 3,010,733, the spindle 16 and the flange 14 thereon can be considered as the equivalents of the previously described bolt 16 and ear 20. Accordingly, the previously described composite bearing 40, the bushing 26, the bushing 28, the composite bearing 42, and the modified nut construction 140 can be placed in the order named on the spindle 16 shown in Patent No. 3,010,733, it being noted that the flange 144 of the nut construction 140 will constitute on use of a cotter pin a fixed abutment against the composite bearing 42 so as to immobilize rotation of the latter about the spindle 16. Such assemblage on the spindle is of course made with the bushings 26 and 28 being placed in the idler arm tubular hub in opposed relation. The spindle 16 of Patent No. 3,010,733 can be modified to include the previously described lubrication passageways 94 and 96 for an analogous purpose in which event the grease fitting would be at the threaded end of the spindle 16 shown in the U.S. Patent No. 3,010,733.

Inasmuch as the illustrated and described embodiments of the invention are subject to numerous variations without departing from the spirit of the invention, attention is directed to the appended claims in order to ascertain the actual scope of the invention.

What is claimed as new is:

1. In an idler arm construction of the type including an idler arm mounted for oscillation about a bolt, the improvement comprising said idler arm including a tubular hub having a bushing of synthetic resin fitted within one end thereof against rotation relative to the hub and the idler arm, said bushing of synthetic resin including as an integral part thereof a radially enlarged portion disposed outside the tubular hub and seated against said end of the latter, with the bolt being rotatably journaled through the bushing, means carried by the bolt that can be fixed against rotation about the latter disposed in spaced relation to the hub and defining an annular abutment facing toward the enlarged portion of the bushing, an annular bearing disposed about the bolt intermediate the abutment and the bushing and in sliding contact with the enlarged portion of the bushing along a contact surface generally symmetrical about the axis of the bolt, means for inhibiting rotation of the annular bearing relative to the bolt and also for accommodating axial alignment of the annular bearing and the bolt to any minor irregularity of the abutment as to symmetry of the side thereof facing the bushing about the axis of the bolt, said last means comprising a layer of deformable material of substantially greater frictional characteristics than the synthetic resin of the bushing and disposed between the abutment and the annular bearing, said layer of deformable material being securely bonded to at least one of the two last-mentioned elements and at least frictionally engaging the other, and means for retaining the hub on the bolt and for urging the hub toward the abutment, whereby the annular bearing and the layer of deformable material are subjected to axial compressive forces by the abutment and the bushing.

2. The combination of claim 1, wherein said deformable material is an elastomer.

3. In an idler arm construction of the type including an idler arm mounted for oscillation about a bolt, the improvement comprising said idler arm including a tubular hub having a bushing of synthetic resin fitted within one end thereof against rotation relative to the hub and the idler arm, said bushing of synthetic resin including as an integral part thereof a radially enlarged portion disposed outside the tubular hub and seated against said end of the latter, with the bolt being rotatably journaled through the bushing, means carried by the bolt that can be fixed against rotation about the latter disposed in spaced relation to the hub and defining an annular abutment facing toward the enlarged portion of the bushing, an annular bearing disposed about the bolt intermediate the abutment and the bushing and in sliding contact with the enlarged portion of the bushing along a contact surface generally symmetrical about the axis of the bolt, means for inhibiting rotation of the annular bearing relative to the bolt, said last means comprising a layer of friction material having generally higher coefficients of friction with metals and synthetic resins than does the synthetic resin of the bushing, said layer of friction material being disposed between the abutment and the annular bearing and being bonded to one of the two last-mentioned elements and in frictional engagement with the other, and means for retaining the hub on the bolt and for urging the hub toward the abutment, whereby the annular bearing and the layer of friction material are subjected to axial compressive forces by the abutment and the bushing.

4. In an idler arm construction of the type including an idler arm mounted for oscillation about a bolt, the improvement comprising said idler arm including a tubular hub having a bushing of synthetic resin fitted within one end thereof against rotation relative to the hub and the idler arm, said bushing of synthetic resin including as an integral part thereof a radially enlarged portion disposed outside the tubular hub and seated against said end of the latter, with the bolt being rotatably journaled through the bushing, means carried by the bolt that can be fixed against rotation about the latter disposed in spaced relation to the hub and defining an annular abutment facing toward the enlarged portion of the bushing, an annular bearing disposed about the bolt intermediate the abutment and the bushing and in sliding contact with the enlarged portion of the bushing along a contact surface generally symmetrical about the axis of the bolt, means for inhibiting rotation of the annular bearing relative to the bolt, said last means comprising a layer of friction material having generally higher coefficients of friction with metals and synthetic resins than does the synthetic resin of the bushing, said layer of friction material being disposed between the abutment and the annular bearing and being bonded to one of the two last-mentioned elements and in frictional engagement with the other, and said enlarged portion of the bushing having a surface that departs from the previously mentioned contact surface by being provided with at least one radially extending groove, and means for retaining the hub on the bolt and for urging the hub toward the abutment, whereby the annular bearing and the layer of friction material are subjected to axial compressive forces by the abutment and the bushing.

5. The combination of claim 4, wherein said groove has an end terminating at the bolt.

6. The combination of claim 5, including lubricant passageway means intermediate the bushing and the bolt that communicates with said groove for at least one rotational position of the bushing relative to the bolt.

7. The combination of claim 6, wherein said passageway means includes at least one groove in the bushing axially extending along the juncture of the latter with the bolt.

8. The combination of claim 6, wherein said passageway means includes at least one groove in the bolt.

9. In an idler arm construction of the type including an idler arm mounted for oscillation about a bolt, the improvement comprising said idler arm including a tubular hub having a nylon bushing fitted within one end thereof against rotation relative to the hub and the idler arm, said bushing including an integral radially enlarged portion of nylon disposed outside the tubular hub and seated against said end of the latter, with the bolt being rotatably journaled through the bushing, means carried by the bolt that can be substantially fixed against rotation about the latter disposed in spaced relation to the hub and defining an annular abutment facing toward and spaced from the enlarged portion of the bushing, an annular bearing of brass disposed about the bolt intermediate the abutment and the bushing and in sliding contact with the enlarged portion of the bushing along a contact surface generally symmetrical about the axis of the bolt, means interposed between the abutment and the brass bearing for inhibiting rotation of the latter relative to the bolt and also for accommodating axial alignment of the brass bearing and the bolt to any minor irregularity of the abutment as to symmetry of the side thereof facing the bushing about the axis of the bolt, said last means comprising a layer of an elastomer disposed about the bolt and interposed between the abutment and the brass bearing, said material being securely bonded to the brass bearing member and engaging the abutment, said elastomer having a substantially higher coefficient of friction with the abutment than brass has with nylon, and means for retaining the hub on the bolt and for urging the hub toward the abutment, whereby the brass bearing member and the layer of an elastomer bonded thereto are subjected to axial compressive forces by the abutment and the bushing.

10. In an idler arm construction of the type including an idler arm mounted for oscillation about a bolt, the improvement comprising said idler arm including a tubular hub having a synthetic resin bushing fitted within one end thereof against rotation relative to the hub and the idler arm, said bushing including as an integral part thereof a radially enlarged portion of said synthetic resin disposed outside the tubular hub and seated against said end of the latter, with the bolt being rotatably journaled through the bushing, means carried by the bolt that can be substantially fixed against rotation about the latter disposed in spaced relation to the hub and defining an annular abutment facing toward and spaced from the enlarged portion of the bushing, an annular bearing disposed about the bolt intermediate the abutment and the bushing and in sliding contact with the enlarged portion of the bushing along a contact surface generally symmetrical about the axis of the bolt, means interposed between the abutment and the annular bearing for inhibiting rotation of the latter relative to the bolt and also for accommodating axial alignment of the annular bearing and the bolt to any minor irregularity of the abutment as to symmetry of the side thereof facing the bushing about the axis of the bolt, said last means comprising a layer of an elastomer material disposed about the bolt and interposed between the abutment and the annular bearing, said material being securely bonded to the annular bearing and engaging the abutment, said elastomer material having a substantially higher coefficient of friction with the abutment than the material of the annular bearing has with the synthetic resin, said enlarged portion of the bushing having a surface that departs from the previously mentioned contact surface by being provided with at least one radially extending groove that is generally of a spiraled configuration, and means for retaining the hub on the bolt and for urging the hub toward the abutment, whereby the annular bearing and the layer of an elastomer material bonded thereto are subjected to axial compressive forces by the abutment and the bushing.

11. The combination of claim 10, wherein said contact surface is substantially planar, with the groove in the bushing extending from the bolt to a radial extremity of the contact surface.

12. The combination of claim 10, wherein said means defining the annular abutment comprises an ear of a mounting bracket provided with an opening through which an end portion of the bolt projects, and means for preventing rotation of the ear relative to the bolt including a washer of an elastomer material and an annular retainer on the end portion of the bolt, said washer being disposed between and engaging the retainer and the ear, and means including a nut threaded on the bolt for axially compressing the washer between the retainer and the ear.

13. The combination of claim 12, wherein the opening through the ear is larger than the portion of the bolt passing therethrough, and the washer being compressed and projecting into space ambient to the bolt in the opening to prevent lateral movement of the bolt in the opening in the ear.

14. A repair or modification kit for conventional idler arm assemblies of the type wherein the tubular hub of an idler arm is disposed between a pair of spaced ears and is mounted to oscillate about an axis extending through the tubular hub and aligned openings through the ears, said kit comprising a pair of aligned bushings having their adjacent ends reduced and adapted to be non-rotatively received in opposed relation in the tubular hub, said bushings being of synthetic resin, a bolt journaled for rotation through the bushings, a pair of annular bearings on the bolt on opposite sides of the bushings and in sliding rotational contact with the latter, said annular bearings each having a side remote from the bushings provided with a layer of an elastomer bonded thereto, each of said coatings having an external surface having a coefficient of friction with metals higher than that which the synthetic resin has with the material of the annular bearings, said external surfaces of the coatings being adapted to frictionally engage adjacent surfaces of the ears, a pair of washers of an elastomer material on said bolt on the opposite sides of the coated bearings, with the adjacent sides of the washers being adapted to contact the opposite sides of the ears, a pair of retainers on the bolt on opposite sides of the washers, said bolt having a head at one end thereof and a nut threaded on the other end thereof, and said bolt being adapted to extend through the tubular hub and the aligned openings through the ears.

15. The combination of claim 14, wherein each of the remote extremities of the bushings is provided with a groove radially extending from the bolt.

16. The combination of claim 15, wherein said bushings are spaced from each other and are adapted to seal against the tubular hub, and passageway means for a lubricant extending centrally from an end of the bolt to an axial position intermediate the bushings and thence opening laterally through the side of the bolt.

17. The combination of claim 16, including lubricant passageway means defined at the juncture of the bolt and the bushings.

References Cited by the Examiner

UNITED STATES PATENTS

| | | | |
|---|---|---|---|
| 1,215,374 | 2/17 | Holmgren | 308—36.4 X |
| 1,898,659 | 2/33 | Gardner | 308—172 X |
| 2,231,037 | 2/41 | Taylor | 267—57.1 |
| 2,620,202 | 12/52 | Coleman | 280—95 |
| 2,642,318 | 6/53 | Ricks. | |
| 2,689,756 | 9/54 | Carlson | 287—93 |
| 2,691,814 | 10/54 | Tait. | |
| 2,809,049 | 10/57 | Carlson | 287—93 X |
| 2,831,737 | 4/58 | Jacoby | 308—240 X |
| 2,884,273 | 4/59 | Sznycer | 287—100 |
| 2,970,853 | 2/61 | Baker | 287—85 X |
| 2,992,939 | 7/61 | Larson | 117—75 |
| 3,010,733 | 11/61 | Melton et al. | 280—95 |
| 3,055,688 | 9/62 | Melton et al. | 280—95 X |
| 3,111,334 | 11/63 | Krizman | 280—95 |

A. HARRY LEVY, *Primary Examiner.*

PHILIP ARNOLD, KENNETH H. BETTS, *Examiners.*